United States Patent
Waheed et al.

(10) Patent No.: US 9,444,661 B2
(45) Date of Patent: Sep. 13, 2016

(54) DC OFFSET TRACKING OF WIRELESS RECEIVERS

(71) Applicant: FREESCALE SEMICONDUCTOR, INC., Austin, TX (US)

(72) Inventors: Khurram Waheed, Austin, TX (US); Kevin B. Traylor, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/604,291

(22) Filed: Jan. 23, 2015

(65) Prior Publication Data

US 2016/0218893 A1    Jul. 28, 2016

(51) Int. Cl.
*H04L 25/06*    (2006.01)

(52) U.S. Cl.
CPC .................................. *H04L 25/067* (2013.01)

(58) Field of Classification Search
CPC ........................ H04L 25/061; H04L 25/067
USPC .................................................. 375/316, 319
See application file for complete search history.

(56) References Cited

U.S. PATENT DOCUMENTS 7,522,900 B2    4/2009  Allott et al.
8,545,411 B2   10/2013  Bae et al.
8,638,883 B2    1/2014  Ashkenazi
8,666,343 B2    3/2014  Shanan
2005/0084043 A1*  4/2005  Yang ..................... H04L 25/062
                                                      375/346

FOREIGN PATENT DOCUMENTS

EP    1524811 B1    4/2005

OTHER PUBLICATIONS

Gander et al. Least-Squares Fitting of Circles and Ellipses. BIT Numerical Mathematics Dec. 1994, vol. 34, Issue 4, pp. 558-578.*

* cited by examiner

*Primary Examiner* — Kevin M Burd (57) ABSTRACT

A receiver system includes a DC (direct current) offset estimation block configured to capture a plurality of sample pairs, each sample pair including a first sample of a first signal and a second sample of a second signal. The first and second signals are passed through one or more gain elements. The DC offset estimation block is also configured to apply a modified circle-fit algorithm to the plurality of sample pairs to estimate a first DC offset exhibited by the first signal and a second DC offset exhibited by the second signal, the first and second DC offsets generated by the gain elements, the modified circle-fit algorithm includes a magnitude approximation term used to iteratively estimate the first and second DC offsets. The receiver system also includes a DC offset correction block configured to calculate one or more correction control signals based on the first and second DC offsets.

14 Claims, 4 Drawing Sheets

DC OFFSET TRACKING OF WIRELESS RECEIVERS

BACKGROUND

1. Field of the Disclosure

The present disclosure relates in general to integrated circuit devices, and more specifically to DC offset tracking of wireless receivers.

2. Description of the Related Art

Direct conversion (DC) receivers convert an RF carrier waveform directly to a baseband frequency. Receiver impairments such as inadequate carrier suppression, 2nd order inter-modulation, mismatches and inherent offsets in the active circuits of the receiver front end all contribute to a DC offset in the down-converted baseband signal. This DC offset can seriously impede normal operation of a receiver by causing saturation, automatic gain control failure, analog-to-digital converter (ADC) dynamic range waste and/or incorrect demodulation by a modem.

DC offset compensation is often used in direct conversion receivers. Factory calibration of DC offsets increases production cost and mechanisms are required to store and manage the data on the device, however. Additionally, DC offsets vary with gain and frequency, so calibration over-all operating conditions can take a lot of time and generate a large amount of data that can consume an impractical amount of space on an integrated circuit die. Alternatively, DC offset calibrations done over only a small subset of radio conditions will be suboptimal for a set of radio operational conditions leading to poor performance.

BRIEF DESCRIPTION OF THE DRAWINGS

The benefits, features, and advantages of the present disclosure will become better understood with regard to the following description, and accompanying drawings where.

DETAILED DESCRIPTION

Embodiments of systems and methods disclosed herein track and compensate direct conversion (DC) offsets in a constant envelope direct conversion receiver, whether or not RF signals are being received during operation. To estimate the DC offsets in the received signals, the center or origin of a circle defined by I and Q components of the RF signals is estimated using a modified circle-fit algorithm that reduces the computational cost by avoiding a division operation. Estimated I and Q DC offset components are used to estimate DC offset correction as a function of the active receiver gain in the receiver front end using DC offset compensation digital to analog converters (DACs) as well as in the digital section of the receiver. Embodiments of the systems and methods can estimate and correct DC offsets even in the absence of a DC calibration scheme.

Figure 1:
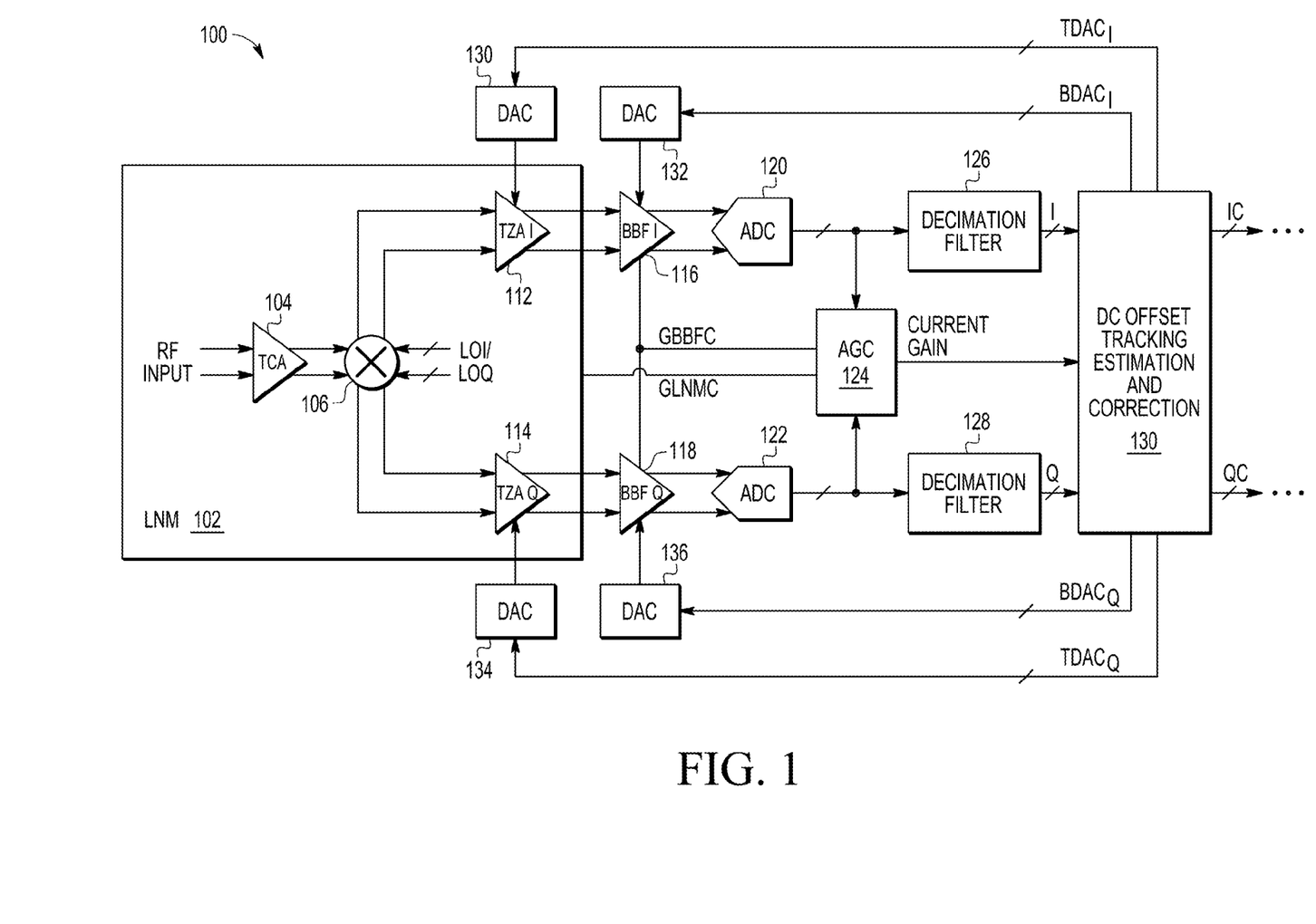
FIG. 1 is a block diagram of a direct conversion (DC) receiver system according to an embodiment.

FIG. 1 is a block diagram of a wireless receiver system 100 according to an embodiment that includes low noise amplifier and mixer (LNM) 102 with transconductance amplifier (TCA) 104, mixer 106, in-phase transimpedance amplifier (TZA) 112 and quadrature TZA 114. TCA 104 receives RF inputs, and provides amplified RF inputs to mixer 106. Mixer 106 generates the in-phase and quadrature RF signals when combined with in-phase and quadrature local oscillator signals LOI, LOQ. The in-phase and quadrature RF signals are input to respective TZAs 112, 114.

Receiver system 100 includes independent branches for processing the differential in-phase and quadrature signals from mixer 106 using components such as respective TZAs 112, 114, baseband filter amplifiers 116, 118, analog to digital converters 120, 122, and decimation filters 126, 128. Automatic gain control module 124 is coupled to receive digital signals from analog to digital converters 120, 122, and to provide gain control signals GLNMC, GBBFC to LNM 102 and baseband filter amplifiers 116, 118, respectively.

Receiver system 100 further includes DC offset tracking estimation and correction module 130 coupled to receive in-phase and quadrature signals (I, Q) from respective decimation filters 126, 128, and the gain currently being used from automatic gain controller (AGC) 124. DC offset tracking estimation and correction module 130 provides digital to analog converter (DAC) correction signals BDACI, TDACI, BDACQ, TDACQ to respective DACs 130, 132, 134, 136. In-phase and quadrature TZAs 112, 114 and BBFs 116, 118 are coupled to receive analog DC offset correction signals from respective DACs 130-136.

The sources of DC offset in receiver system 100 can originate in several different locations. A first component referred to as in-phase and quadrature RF DC offset is found in the input to TCA 104 or mixer 106. The DC offset in the RF input signals typically scales with the gain in LNM 102 (i.e., gain in mixer 106, TCA 104 and TZAs 112, 114) as well as gain in BBFs 116, 118. A second component referred to as TZA DC offset is found in the output of TZAs 112, 114 and scales with BBF gain. A third component referred to as baseband DC offset is found in the output of BBFs 116, 118 and does not scale with receiver front end (analog) gain. Note that in some implementations, a static gain may affect the DC offset due to mapping in ADCs 120, 122 from analog to digital representation. By tracking the DC offset, a decision can be made whether to correct the I and Q signals on an on-going basis, or wait until the DC offset is greater than a minimum threshold value before applying the corrections.

Figure 2:
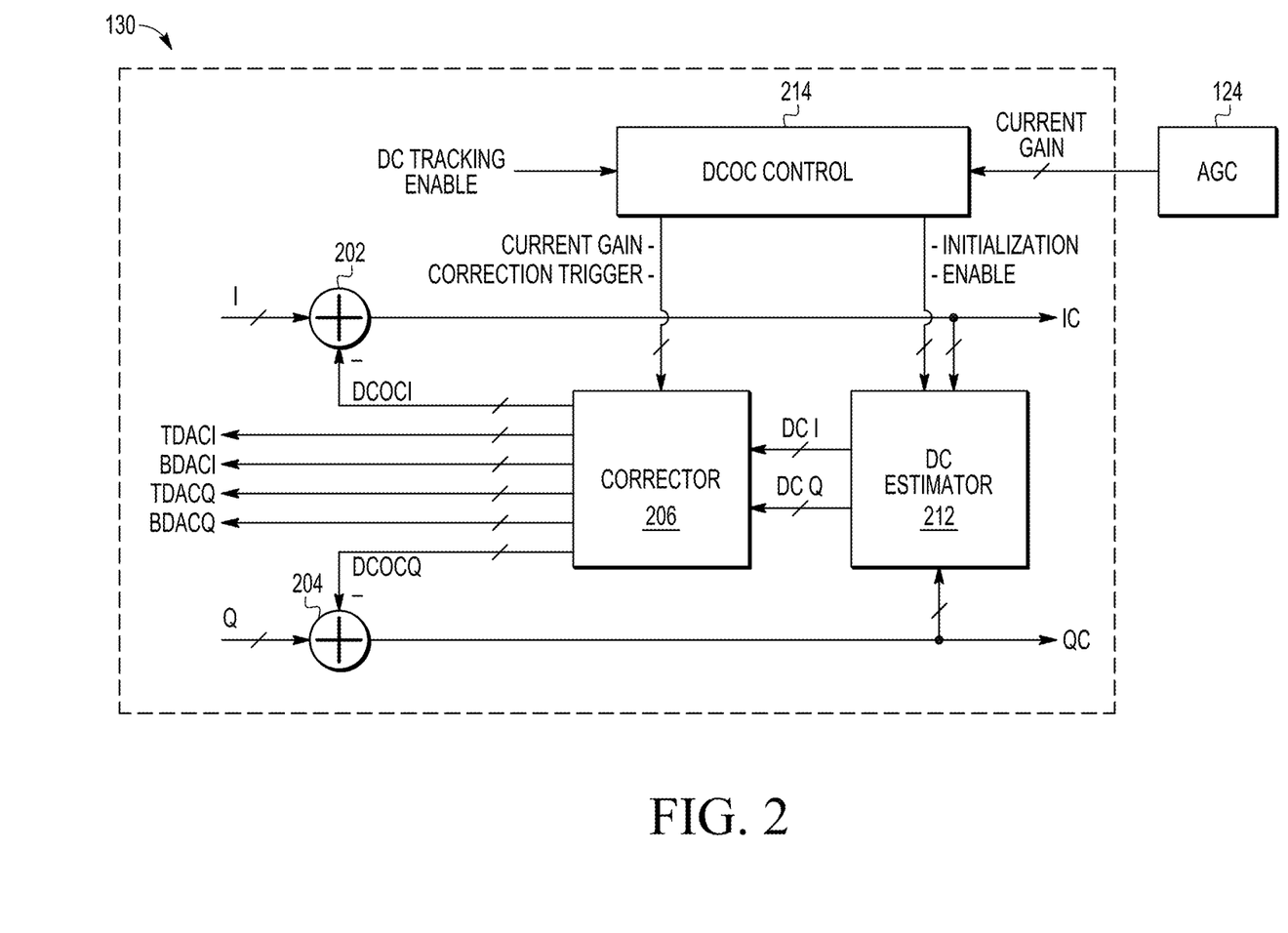
FIG. 2 is a block diagram of an embodiment of a DC offset tracking module that can be used in the direct conversion receiver system of FIG. 1.

Referring to FIGS. 1 and 2, FIG. 2 is a block diagram of an embodiment of DC offset tracking estimation and correction module 130 that can be used in the direct conversion receiver system 100 of FIG. 1 that includes summing junctions 202, 204, corrector module 206, DC estimator module 212, and DCOC control module 214. Summing junction 202 has a non-negating input coupled to receive the in-phase (I) component of the RF signal and a negating input coupled to receive an in-phase DC offset correction signal (DCOCI) from corrector 206. Summing junction 204 has a non-negating input coupled to receive the quadrature (Q) component of the RF signal and a negating input coupled to receive a quadrature DC offset correction signal (DCOCQ) from corrector 206. The respective outputs of summing junctions 202, 204 are corrected I and Q signals (IC, QC) and are provided to DC estimator module 212.

DCOC control module 214 is coupled to receive a DC tracking enable signal from a radio controller (not shown) and the gain value currently being used by AGC 124. DCOC control module 124 is further coupled to provide the current gain and a correction trigger signal to corrector 206, and to provide initialization information and an enable signal to DC estimator 212.

DC estimator module 212 receives corrected I and Q signals (IC, OC) and provides estimated DC level in the in-phase and quadrature signals (DCI and DCQ) to corrector module 206. Corrector module 206 receives the estimated in-phase and quadrature DC signals DCI and DCQ from estimator module 212 and provides DAC dc offset correction signals TDACI, BDACI, TDACQ, BDACQ to respective DACs 130, 132, 134, 136, and digital DC offset correction signals DCOCI and DCOCQ to respective summing junctions 204, 202.

In some embodiments, the correction trigger signal indicates whether the DC offset correction signals DCOCI and DCOCQ, and DAC DC offset correction signals TDACI, BDACI, TDACQ, BDACQ should be computed. If the DC offset is below a minimum value, the cost of computing the DC offset correction signals can be saved by waiting to calculate the DC offset correction signals until the DC offset is above the minimum value.

Figure 3:
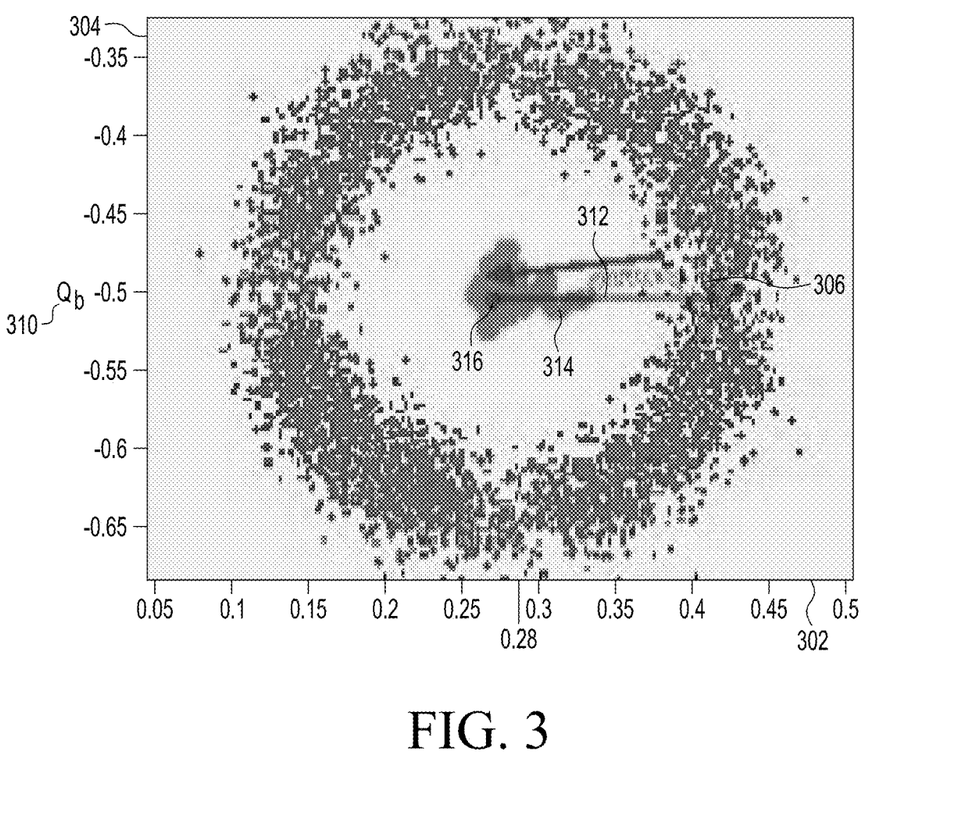
FIG. 3 shows an example of a representative diagram of a noisy complex signal including DC offset in a complex plane with a real or in-phase (I) axis and an imaginary or quadrature (Q) axis.

FIG. 3 shows a representative diagram of a noisy complex signal including DC offset in a complex plane with a real or in-phase (I) axis 302 and an imaginary or quadrature (Q) axis 304. A signal with no DC offset where the power is not varying would be represented by a circle centered at the origin 306 with a radius corresponding to the envelope amplitude or power of the signal. The noisy signal depicted is represented by a circle 300 of points scattered about an average radius "r" 312 centered at DC offset 316. The scattered points indicate the I and Q signals at various times. DC offset 316 is represented by the coordinates "a" 308 on the real axis 302 and "b" 310 on the imaginary axis 304. DC offset tracking estimation and correction module 130 uses the noisy I and Q signals to estimate the DC offset and generate corrections to remove the DC offset from the I and Q signals in receiver 100.

In FIG. 3, the DC offset was initialized at a random signal sample at coordinates (0.28, −0.5) corresponding to origin 306. As sample points were measured, DC offset tracking estimation and correction module 130 provided estimates of the DC offset that followed a path 314 from the origin 306 of the graph to an estimated DC offset 316 that is offset by coordinates a 308 and b 310.

Figure 4:
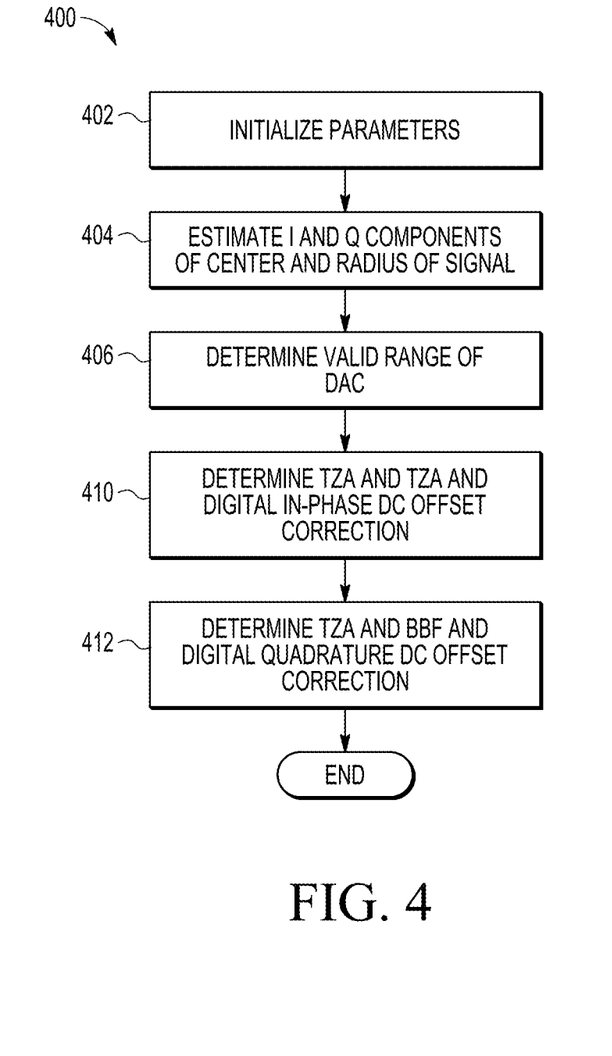
FIG. 4 shows a flow diagram of an embodiment of a method that can be implemented in the receiver system of FIG. 1 to track and correct DC offset.

Referring to FIGS. 1-4. FIG. 4 shows a flow diagram of an embodiment of a method 400 that can be implemented in receiver 100 to track and correct DC offset. In process 402, DC estimator module 212 initializes parameters used to estimate the I and Q signals, including the center 316 and average radius of circle 300. An example of parameters that can be initialized are shown in Table 1:

TABLE 1

| Parameter and Initial Value | Description |
|---|---|
| alpha_radius = 1/4 | Initial step size for radius of circle |
| alphac_scaling = 1/1 | Scaling factor for center of circle with respect to radius |
| sign_scaling = 1/2 | Scaling factor for sign-based correction, which is the inverse of the gamma parameter |
| alpha_center = alpha_radius * alphac_scaling | Initial step size rate for center |
| gs_step1 = 64 | Count value at a Receiver clock (e.g., ADC_clk/Decim_Rate) for step 1 reduction of DC tracking step sizes. The values are adjusted as the iterations are made to achieve a smooth convergent value for the DC corrections. |
| gs_step2 = 384 | Count of Receiver ADC_clk/Decim_Rate for step 2 reduction of step sizes |
| TZA_dac_step = 1.4/($2^8$) | 8 bit TZA DAC LSB size in V |
| BBF_dac_step = 1.2/($2^6$) | 6 bit BBF DAC LSB size in V |
| AGC_LSB = (2.0/($2^{12}$)) | DC offset correction parameter (12 bits) - value of least significant bit in gain |
| AGC_Gain = 17/32 | DC offset correction parameter - current gain from Automatic Gain Control |

The parameters gs_step1 and gs_step2 are referred to as gear-shifting steps to change the DC tracking estimator step-size(s) (or loop bandwidth) after a specified number of samples have been measured and the corresponding correction has been applied. For example, a large step size can be used initially, and a second smaller step size can be used as the estimator gets closer to converging on an estimate for the DC offset, as shown for example, by path 314 where the number of points increases closer to the center 316 of circle 300.

The step size for estimating the DC offset for the TZA and BBF DACS 130, 134 can be determined using parameters from Table 1 and can be based on the current gain from AGC module 124 as follows:

TZA_dcoc_step_norm=TZA_dac_step/
    ADC_LSB*AGC_Gain

BBA_dcoc_step=BBA_dac_step/
    ADC_LSB*AGC_Gain

Once the parameters are initialized in process 402, process 404 includes estimating the I and Q DC offset components for the center of signal circle 300 as well as the radius. The center of the circle can be initialized at zero, or at the available values of the I and Q signals, shown as IC and QC in FIG. 2. If a clock counter is less than a predetermined value, the first gear shift step value gs_step1 can be used to adjust the alphar and alphac parameters in Table 1. Otherwise, when the clock counter is greater than the predetermined value, the second gear shift step value gs_step2 can be used. As an example, the first and second gear shift step values gs_step1 and gs_step2 can be used to compute initial values for the radius and center as follows:

if clk_cnt is less than or equal to gs_step1 and gear shifting is enabled,
    alphar = alpha_radius/2
    alphac = alphar*alpha_scaling -continued

```
else if clk_cnt is less than or equal to gs_step2 and gear shifting is
    enabled,
        alphar = alpha_radius/4
        alphac = alphar*alpha_scaling
end if
```

An estimate of the radius and DC offset (center) for circle 300 can then be determined using a simplified Signum circle fit algorithm using the following equations:

$$\varepsilon = x(i) - c(i-1)$$
$$\Delta r(i) = \|x(i) - c(i-1)\| = \|\varepsilon\|$$
$$\Delta c(i) = x(i) - r(i-1) * \frac{\text{sign}(\varepsilon)}{\gamma}; \gamma > 1$$

Where x is the input vector (complex variable I and Q), c is the center of circle 300 (complex variable I and Q) and r is the radius of the circle. The term γ can be equivalence to $2^n$ where n>1 to avoid division and ensure that the eigenvalues are stable. The equations for the radius and center of circle 300 for each sample point then become:

$$r(i) = \alpha[\Delta r(i) - r(i-1)] + r(i-1)$$

$$c(i) = \alpha[\Delta c(i) - c(i-1)] + c(i-1)$$

Where, for example, the following magnitude approximation can be used to determine a while avoiding square root and squaring functions of the magnitude given by sqrt($I^2$+$Q^2$):

$$a = I + jQ$$
$$\|a\| \approx \max(|I|, |Q|) + \frac{3 * \min(|I|, |Q|)}{8}$$

The preceding equations can be implemented with the alphar and alphac parameters (determined hereinabove) as follows:

```
epsilon_I = IC - Icenter
epsilon_Q = QC - Qcenter
i_abs = abs(epsilon_I)
q_abs = abs(epsilon_Q)
delta_radius = max(i_abs,q_abs)+min(i_abs,q_abs)*3/8
delta_Icenter = I - Radius * sign(epsilon_I)*sign_scaling
delta_Qcenter = Q - Radius * sign(epsilon_Q)*sign_scaling
Icenter = alphac*delta_Icenter + (1-alphac)*Icenter
Qcenter = alphac*delta_Qcenter + (1-alphac)*Qcenter
Radius = alphar*delta_radius + (1-alphar)*Radius
Output variables from DC estimator 212 are assigned as
    DCI_est = Icenter
    DCQ_est = Qcenter
```

The outputs from estimator 212 are provided to corrector 202. An example of logic for processes 406 and 410 that can be included in corrector 202 to determine in-phase DC offset corrections DCOCI, TDACI, and BDACI is as follows:

```
function [TDACI, BDACI, DCOCI, Total_dc_estim_I] = DCOC(DCI_est, dcoc_reset,
    TZA_dcoc_step, BBF_dcoc_step, TDACI_init, BDACI_init, DCOCI_init)
    % DC offset correction DAC Valid Range (shown as an example of process 406) for
        an 8 bit TZA DAC 130 and a 6 bit BBF DAC 132
    TZA_ENOB = 8;
    TZA_max = 2^(TZA_ENOB-1)-1;
    TZA_min = -2^(TZA_ENOB-1);
    BBF_ENOB = 6;
    BBF_max = 2^(BBF_ENOB-1)-1;
    BBF_min = -2^(BBF_ENOB-1);
    total_DCI = DCI_est - (TZA_correction * TZA_dcoc_step) - (BBF_correction *
        BBF_dcoc_step) - Dig_correction;           % with correction
    % Calculate TZA DAC Correction for the in-phase signal
    if abs(total_DCI) >= TZA_dcoc_step
        TZA_correction_I = -round(total_DCI*TZA_dcoc_step_recip);
        % Apply saturation
        if TZA_correction_I > TZA_max
            TZA_correction_I = TZA_max;
        elseif TZA_correction_I < TZA_min
            TZA_correction_I = TZA_min;
        end
        TZA_DCI_residual = total_DCI + TZA_correction_I * TZA_dcoc_step;
    else
        TZA_correction_I = 0;
        TZA_DCI_residual = total_DCI;
    end
    % Calculate BBF DAC Correction for the in-phase signal
    if abs(TZA_DCI_residual) >= BBF_dcoc_step
        BBF_correction_I = -floor(TZA_DCI_residual*BBF_dcoc_step_recip);
        % Apply saturation
        if BBF_correction_I > BBF_max
            BBF_correction_I = BBF_max;
        elseif BBF_correction_I < BBF_min
            BBF_correction_I = BBF_min;
        end
        BBF_DCI_residual = TZA_DCI_residual + BBF_correction_I * BBF_dcoc_step;
    else
        BBF_correction_I = 0;
```

```
    BBF_DCI_residual = TZA_DCI_residual;
  end
  % Calculate digital correction for the in-phase signal
  Dig_correction_I = -BBF_DCI_residual;    % if the residual is already in correct
                                              scaling. Otherwise this would be -
                                              BBF_DCI_residual/dc_dig_scale;
  % Assign Output Variables & convert DAC inputs to unsigned
  TDACI = TZA_correction_I + 128;
  BDACI = BBF_correction_I + 32;
  DCOCI = Digital_correction_I;
  Total_dc_estim_I = total_dc_I;
```

In the above example equation for TDACI, the code "128" is a DAC bias term for a DAC that is an unsigned DAC with 1-256 levels. Code 128 is the middle and a correction of 0 is mapped to it. A correction of −128 would result in a DAC Code of 0, which corresponds to the minimum voltage driven out by the DAC and has a negative value with respect to the circuit operating point, when the DAC is being driven by a DAC correction value of 0. Similarly, for the example equation for BDACI above, the code "32" is a DAC bias term for a DAC with 6 bits. Other suitable bias numbers can be used for DACs with different numbers of bits.

Once the in-phase DC offset corrections are determined in process 410, processes 412 and 414 determine the offset corrections for the quadrature DC offset at TZA and BBF DACs 134, 136 and the digital offset correction used at summing junction 204 using a function similar to the preceding logic with the inputs and outputs for the quadrature signal substituted for the in-phase signals. For example, the function call for the quadrature DC offset correction at TZA and BBF DACs 134, 136 and summing junction 204 could be:

```
function[TDACQ, BDACQ, DCOCQ, Total_dc_es-
   tim_Q]=DCOC(DCQ_est, dcoc_reset, TZA_d-
   coc_step, BBF_dcoc_step, TDACQ_init,
   BDACQ_init, DCOCQ_init).
```

Method 400 can be used during active reception to track and null the dynamic receiver DC offsets under varying receiver operating conditions. A simplified version of the Signum circle-fit algorithm can been used to avoid division operation. Calculating DC offset corrections as a function of active receiver gain minimizes DC offsets in RF.

By now it should be appreciated that in some embodiments, a receiver system can comprise a DC (direct current) offset estimation block configured to capture a plurality of sample pairs received at the DC offset estimation block, each sample pair including a first sample of a first signal (in-phase) and a second sample of a second signal (quadrature). The first signal and the second signal can be passed through one or more gain elements (TCA, TZA, BBA) in the receiver system. A modified circle-fit algorithm can be applied to the plurality of sample pairs to estimate a first DC offset exhibited by the first signal and a second DC offset exhibited by the second signal. The first and second DC offsets can be generated by the one or more gain elements, and the modified circle-fit algorithm can include a magnitude approximation term used to iteratively estimate the first and second DC offsets. A DC offset correction block can be configured to calculate one or more correction control signals (BDAC, TDAC) based on the first and second DC offsets.

In another aspect, the modified circle-fit algorithm can be configured to iteratively adjust a radius and a center point of a best-fit circle to fit the best-fit circle to a plurality of sample points located on a complex plane. Each of the plurality of sample points can correspond to one sample pair of the plurality of sample pairs, and the center point of the best-fit circle can correspond to the first and second DC offsets.

In another aspect, the DC offset estimation block can be further configured to utilize an initial sample point as an initial center point of the best-fit circle.

In another aspect, the DC offset estimation block can be further configured to calculate a first estimation value ($\epsilon I$=Isample−Icenter) comprising a difference between a first sample value (Isample) of a present sample point and a first center value (Icenter) of a present center point of the best-fit circle, and calculate a second estimation value ($\epsilon Q$=Qsample−Qcenter) comprising a difference between a second sample value (Qsample) of the present sample point and a second center value (Qcenter) of the present center point.

In another aspect, the DC offset estimation block can be further configured to calculate the magnitude approximation term ($\|a\|$=max($|\epsilon I|,|\epsilon Q|$)+min($|\epsilon I|,|\epsilon Q|$)*3/8) comprising a summation of a first term and a second term. The first term can comprise a maximum value of an absolute value of the first estimation value ($|\epsilon I|$) and an absolute value of the second estimation value ($|\epsilon Q|$), and the second term can comprise a minimum value of the absolute value of the first estimation value ($|\epsilon I|$) and the absolute value of the second estimation value ($|\epsilon Q|$) multiplied by a scaling factor.

In another aspect, the scaling factor can equal 3/8.

In another aspect, the DC offset estimation block can be further configured to calculate a first center estimation value ($\Delta$Icenter=Isample−R*sign($\epsilon$I)/$\gamma$) based on a difference between the first sample value (Isample) and a present radius value (R) multiplied by a first sign factor of the first estimation value (sign($\epsilon$I)) and a weighted value ($\gamma$), and calculate a second center estimation value ($\Delta$Qcenter=Qsample−R*sign($\epsilon$Q)/$\gamma$) based on a difference between the second sample value (Qsample) and the present radius value (R) multiplied by a second sign factor of the second estimation value (sign($\epsilon$Q)) and the weighted value ($\gamma$). The weighted value ($\gamma$) can be configured to cause the modified circle-fit algorithm to converge. The first and second sign factors each have a magnitude of one, the first sign factor has a same sign as the first estimation value, and the second sign factor has a same sign as the second estimation value.

In another aspect, the DC offset estimation block can be further configured to calculate a new first center value of a new center point (new Icenter=$\alpha$c*$\Delta$Icenter+(1−$\alpha$c) Icenter) of the best-fit circle comprising a summation of a first term and a second term. The first term can comprise the first center estimation value ($\Delta$Icenter) multiplied by a first scaling value ($\alpha$c). The second term can comprise the first center value (Icenter) of the present center point multiplied by a second scaling value, and the second scaling value can comprise one minus the first scaling value (1−αc). A new second center value of the new center point (new Qcenter=αc*ΔQcenter+(1−αc) Qcenter) can be calculated using a summation of a third term and a fourth term. The third term comprises the second center estimation value (ΔQcenter) multiplied by the first scaling value (αc), and the fourth term comprises the second center value (Qcenter) of the present center point multiplied by the second scaling value (1−αc).

In another aspect, the DC offset estimation block can be further configured to calculate a new radius value (new R=αr*Δr+(1−αr)*R) of the best-fit circle comprising a summation of the magnitude approximation term (∥a∥=Δr) multiplied by a first weighted value (αr) and a present radius value (R) of the best-fit circle multiplied by a second weighted value (1−αr). The second weighted value can comprise one minus the first weighted value.

In another aspect, the magnitude approximation term does not include a square root function or a square function (as in, don't use sample radius=√(εI$_2$+εQ$^2$) for each sample point).

In another aspect, the receiver system can further comprise one or more digital-to-analog converters (DACs), each configured to receive one of the correction control signals, and output a DC offset correction signal to a respective one of the gain elements. Each of the gain elements can exhibit a component of the first and second DC offsets, and the DC offset correction signal can be configured to correct at least one component of the first and second DC offsets.

In another embodiment, a semiconductor device can comprise a receiver system including one or more gain elements (TCA/TZA/BBF), and a DC (direct current) offset estimation block configured to capture a plurality of sample pairs received at the DC offset estimation block, each sample pair including a first sample of a first signal (in-phase) and a second sample of a second signal (quadrature). The first signal and the second signal can be passed through the one or more gain elements (TCA, TZA, BBA) in the receiver system. A modified circle-fit algorithm can be applied to the plurality of sample pairs to estimate a first DC offset exhibited by the first signal and a second DC offset exhibited by the second signal. The first and second DC offsets can be generated by the one or more gain elements, and the modified circle-fit algorithm can include a magnitude approximation term (∥a∥) used to iteratively estimate the first and second DC offsets.

In another aspect, the receiver system can further comprise one or more digital-to-analog converters (DACs), each configured to receive a correction control signal generated by the DC offset estimation block, and output a DC offset correction signal to a respective one of the gain elements in response to receipt of the correction control signal. Each of the gain elements can exhibit a component of the first and second DC offsets, and the DC offset correction signal can be configured to correct at least one component of the first and second DC offsets.

In another embodiment, a method of operating a receiver system can comprise capturing a plurality of sample pairs received at a DC (direct current) offset estimation block of the receiver system, each sample pair including a first sample of a first signal (in-phase) and a second sample of a second signal (quadrature). The first signal and the second signal can be passed through one or more gain elements (TCA, TZA, BBA) in the receiver system. A modified circle-fit algorithm can be applied to the plurality of sample pairs to estimate a first DC offset exhibited by the first signal and a second DC offset exhibited by the second signal. The first and second DC offsets can be generated by the one or more gain elements. The modified circle-fit algorithm can include a magnitude approximation term (∥a∥) used to iteratively estimate the first and second DC offsets. One or more correction control signals (BDAC, TDAC) can be calculated based on the first and second DC offsets.

In another aspect, the modified circle-fit algorithm can be configured to iteratively adjust a radius and a center point of a best-fit circle to fit the best-fit circle to a plurality of sample points located on a complex plane. Each of the plurality of sample points corresponds to one sample pair of the plurality of sample pairs, and the center point of the best-fit circle can correspond to the first and second DC offsets.

In another aspect, the method can further comprise calculating a first estimation value (εI=Isample−Icenter) comprising a difference between a first sample value (Isample) of a present sample point and a first center value (Icenter) of a present center point of the best-fit circle; and calculating a second estimation value (εQ=Qsample−Qcenter) comprising a difference between a second sample value (Qsample) of the present sample point and a second center value (Qcenter) of the present center point.

In another aspect, the method can further comprise calculating the magnitude approximation term (∥a∥=max(∣εI∣, ∣εQ∣)+min(∣εI∣,∣εQ∣)*3/8) comprising a summation of a first term and a second term. The first term can comprise a maximum value of an absolute value of the first estimation value (∣εI∣) and an absolute value of the second estimation value (∣εQ∣), and the second term can comprise a minimum value of the absolute value of the first estimation value (∣εI∣) and the absolute value of the second estimation value (∣εQ∣) multiplied by a scaling factor.

In another aspect, the method can further comprise calculating a first center estimation value (ΔIcenter=Isample−R*sign(εI)/γ) based on a difference between the first sample value (Isample) and a weighted value of a present radius value (R/γ) of the present best-fit circle multiplied by a first sign factor of the first estimation value (sign(εI)). A second center estimation value (ΔQcenter=Qsample−R*sign(εQ)/γ) can be calculated based on a difference between the second sample value (Qsample) and the weighted value of the present radius value (R/γ) multiplied by a second sign factor of the second estimation value (sign(εQ)). The weighted value of the present radius value (R/γ) can be configured to cause the modified circle-fit algorithm to converge. The first and second sign factors each have a magnitude of one, the first sign factor has a same sign as the first estimation value, and the second sign factor has a same sign as the second estimation value.

In another aspect, the method can further comprise calculating a new first center value (new Icenter=αc*ΔIcenter+(1−αc) Icenter) of a new center point of the best-fit circle comprising a summation of a first term and a second term. The first term can comprise the first center estimation value (ΔIcenter) multiplied by a first scaling value (αc). The second term can comprise the first center value (Icenter) of the present center point multiplied by a second scaling value, and the second scaling value comprises one minus the first scaling value (1−αc). A new second center value of the new center point (new Qcenter=αc*ΔQcenter+(1−αc) Qcenter) can be calculated using a summation of a third term and a fourth term. The third term can comprise the second center estimation value (ΔQcenter) multiplied by the first scaling value (αc), and the fourth term can comprise the second center value (Qcenter) of the present center point multiplied by the second scaling value (1−αc).

In another aspect, the method can further comprise calculating a new radius value (new R=αr*Δr+(1−αr)R) of the best-fit circle based on a first weighted value of the magnitude approximation term (‖a‖=Δr, Δr*αr) and a second weighted value of a present radius value ((1−αr)*R) of the best-fit circle.

This disclosure is presented to enable one of ordinary skill in the art to make and use the present disclosure as provided within the context of a particular application and its requirements. Various modifications to the preferred embodiments will, however, be apparent to one skilled in the art, and the general principles defined herein may be applied to other embodiments. Therefore, the present disclosure is not intended to be limited to the particular embodiments shown and described herein, but is to be accorded the widest scope consistent with the principles and novel features herein disclosed.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of systems disclosed herein are circuitry located on a single integrated circuit or within a same device. Alternatively, the systems may include any number of separate integrated circuits or separate devices interconnected with each other. Also for example, a system or portions thereof may be soft or code representations of physical circuitry or of logical representations convertible into physical circuitry. As such, a system may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A receiver system comprising:
    a DC (direct current) offset estimation circuit configured to
        capture a plurality of sample pairs received at the DC offset estimation circuit, each sample pair including a first sample of a first signal and a second sample of a second signal, wherein
            the first signal and the second signal are passed through one or more gain elements in the receiver system, and
        apply a modified circle-fit algorithm to the plurality of sample pairs to estimate a first DC offset exhibited by the first signal and a second DC offset exhibited by the second signal, wherein
            the first and second DC offsets are generated by the one or more gain elements, and
            the modified circle-fit algorithm iteratively estimates the first and second DC offsets by using a magnitude approximation to iteratively adjust a radius and a center point of a best-fit circle to fit the best-fit circle to a plurality of sample points located on a complex plane;
            each of the plurality of sample points corresponds to one sample pair of the plurality of sample pairs, and
            the center point of the best-fit circle corresponds to the first and second DC offsets; and
    a DC offset correction circuit configured to
        calculate one or more correction control signals based on the first and second DC offsets;
        calculate a first estimation value comprising a difference between a first sample value of a present sample point and a first center value of a present center point of the best-fit circle; and
        calculate a second estimation value comprising a difference between a second sample value of the present sample point and a second center value of the present center point.

2. The receiver system of claim 1, wherein the DC offset estimation circuit is further configured to
    utilize an initial sample point as an initial center point of the best-fit circle.

3. The receiver system of claim 1, wherein the DC offset estimation circuit is further configured to
    calculate the magnitude approximation term comprising a summation of a first term and a second term, wherein
        the first term comprises a maximum value of an absolute value of the first estimation value and an absolute value of the second estimation value, and the second term comprises a minimum value of the absolute value of the first estimation value and the absolute value of the second estimation value multiplied by a scaling factor.

4. The receiver system of claim 3, wherein the scaling factor equals ⅜.

5. The receiver system of claim 3, wherein the DC offset estimation circuit is further configured to
calculate a new radius value of the best-fit circle comprising a summation of the magnitude approximation term multiplied by a first weighted value and a present radius value of the best-fit circle multiplied by a second weighted value, wherein
the second weighted value comprises one minus the first weighted value.

6. The receiver system of claim 1, wherein the DC offset estimation circuit is further configured to
calculate a first center estimation value based on a difference between the first sample value and a present radius value multiplied by a first sign factor of the first estimation value and a weighted value, and
calculate a second center estimation value based on a difference between the second sample value and the present radius value multiplied by a second sign factor of the second estimation value and the weighted value, wherein
the weighted value is configured to cause the modified circle-fit algorithm to converge,
the first and second sign factors each have a magnitude of one,
the first sign factor has a same sign as the first estimation value, and
the second sign factor has a same sign as the second estimation value.

7. The receiver system of claim 6, wherein the DC offset estimation circuit is further configured to
calculate a new first center value of a new center point of the best-fit circle comprising a summation of a first term and a second term, wherein
the first term comprises the first center estimation value multiplied by a first scaling value,
the second term comprises the first center value of the present center point multiplied by a second scaling value, and
the second scaling value comprises one minus the first scaling value, and
calculate a new second center value of the new center point comprising a summation of a third term and a fourth term, wherein
the third term comprises the second center estimation value multiplied by the first scaling value,
the fourth term comprises the second center value of the present center point multiplied by the second scaling value.

8. The receiver system of claim 1, wherein
the magnitude approximation term does not include a square root function or a square function.

9. The receiver system of claim 1, further comprising:
one or more digital-to-analog converters (DACs), each configured to receive one of the correction control signals, and
output a DC offset correction signal to a respective one of the gain elements, wherein
each of the gain elements exhibits a component of the first and second DC offsets, and
the DC offset correction signal is configured to correct at least one component of the first and second DC offsets.

10. A method of operating a receiver system comprising:
capturing a plurality of sample pairs received at a DC (direct current) offset estimation block of the receiver system, each sample pair including a first sample of a first signal and a second sample of a second signal, wherein the first signal and the second signal are passed through one or more gain elements in the receiver system;
applying a modified circle-fit algorithm to the plurality of sample pairs to estimate a first DC offset exhibited by the first signal and a second DC offset exhibited by the second signal, wherein
the first and second DC offsets are generated by the one or more gain elements, and
the modified circle-fit algorithm iteratively estimates the first and second DC offsets by using a magnitude approximation to iteratively adjust a radius and a center point of a best-fit circle to fit the best-fit circle to a plurality of sample points located on a complex plane,
each of the plurality of sample points corresponds to one sample pair of the plurality of sample pairs,
the center point of the best-fit circle corresponds to the first and second DC offsets;
calculating one or more correction control signals based on the first and second DC offsets;
calculating a first estimation value comprising a difference between a first sample value of a present sample point and a first center value of a present center point of the best-fit circle; and
calculating a second estimation value comprising a difference between a second sample value of the present sample point and a second center value of the present center point.

11. The method of claim 10, further comprising:
calculating the magnitude approximation term comprising a summation of a first term and a second term, wherein
the first term comprises a maximum value of an absolute value of the first estimation value and an absolute value of the second estimation value, and
the second term comprises a minimum value of the absolute value of the first estimation value and the absolute value of the second estimation value multiplied by a scaling factor.

12. The method of claim 10, further comprising:
calculating a first center estimation value based on a difference between the first sample value and a weighted value of a present radius value of the present best-fit circle multiplied by a first sign factor of the first estimation value, and
calculating a second center estimation value based on a difference between the second sample value and the weighted value of the present radius value multiplied by a second sign factor of the second estimation value, wherein
the weighted value of the present radius value is configured to cause the modified circle-fit algorithm to converge,
the first and second sign factors each have a magnitude of one,
the first sign factor has a same sign as the first estimation value, and
the second sign factor has a same sign as the second estimation value.

13. The method of claim 12, further comprising:
calculating a new first center value of a new center point of the best-fit circle comprising a summation of a first term and a second term, wherein
- the first term comprises the first center estimation value multiplied by a first scaling value,
- the second term comprises the first center value of the present center point multiplied by a second scaling value, and
- the second scaling value comprises one minus the first scaling value, and calculating a new second center value of the new center point comprising a summation of a third term and a fourth term, wherein
- the third term comprises the second center estimation value multiplied by the first scaling value,
- the fourth term comprises the second center value of the present center point multiplied by the second scaling value.

14. The method of claim 13, further comprising:
calculating a new radius value of the best-fit circle based on a first weighted value of the magnitude approximation term and a second weighted value of a present radius value of the best-fit circle.

* * * * *